US005468564A

United States Patent [19]

Ohtani et al.

[11] Patent Number: 5,468,564

[45] Date of Patent: Nov. 21, 1995

[54] TRANSFER PAPER AND METHOD OF MANUFACTURING THE SAME

[75] Inventors: Teiichi Ohtani; Shoichi Endo; Teruhisa Shimada; Yoshihiro Kuroyama, all of Tokyo, Japan

[73] Assignee: Nippon Paper Industries Co., Ltd., Tokyo, Japan

[21] Appl. No.: 231,094

[22] Filed: Apr. 22, 1994

[30] Foreign Application Priority Data

| | | | |
|---|---|---|---|
| Apr. 23, 1993 | [JP] | Japan | 5-120698 |
| Apr. 14, 1994 | [JP] | Japan | 6-100814 |

[51] Int. Cl.$^6$ .......... B32B 29/00

[52] U.S. Cl. .......... 428/537.5; 428/195; 428/304.4; 428/308.8; 428/314.8; 428/411.1; 428/425.1; 428/478.8; 428/488.1; 428/496; 428/507; 428/688

[58] Field of Search .......... 428/305, 306, 428/195, 325, 207, 913, 914, 304.4, 308.8, 314.8, 307.8, 411.1, 425.1, 478.8, 488.1, 537.5, 496, 507, 688; 503/227

[56] References Cited

U.S. PATENT DOCUMENTS

| | | | |
|---|---|---|---|
| 4,746,646 | 5/1988 | Nakanishi et al. | 503/227 |
| 5,110,788 | 5/1992 | Katayama et al. | 503/227 |
| 5,141,916 | 8/1992 | Katayama et al. | 503/227 |

*Primary Examiner*—Patrick J. Ryan
*Assistant Examiner*—William A. Krynski
*Attorney, Agent, or Firm*—Millen, White, Zelane & Branigan

[57] ABSTRACT

Disclosed is a transfer paper comprising a support coated on at least one side with a transfer layer having a thickness of not less than 3 μm and at least one constituent layer; with the outermost layer of said transfer layer being a coated layer containing at least a pigment and a binder, and having in the part extending to the depth of at least 3 μm below the surface the hole distribution characterized by having at least one peak which shows the average pore diameter within the range of 0.1 to 1.0 μm and the height ranging from 0.1 to 1.0 ml/g with respect to the pore volume when measured with a porosimeter of mercury injection type.

17 Claims, No Drawings

TRANSFER PAPER AND METHOD OF MANUFACTURING THE SAME

FIELD OF THE INVENTION

The present invention relates to a transfer paper for xerography or thermal transfer printing and, more particularly, to a transfer paper which can reproduce images of high quality almost equal to those obtainable in photography and graphic arts when used in a color printer or color copying machine of the type which utilizes a xerographic process or a thermally fused ink transfer process.

BACKGROUND OF THE INVENTION

As for the transfer paper for xerography, non-coated papers such as wood free paper and the like have been prevailingly used. Even when conventional coated papers for graphic arts including art paper are used, however, high quality images cannot be obtained.

As a reason for it, it can be thought that prior to thermal fixation a satisfactory toner image can be obtained on art paper or another coated paper since such paper can come into uniform contact with a photoreceptor upon copying operation because of its very high surface smoothness, but it becomes difficult for the paper upon thermal fixation to retain the whole toner thereon because the surface layer of the paper is too compact, and thereby part of toner is scattered.

Further, ordinary coated papers for graphic arts are usually insufficient in gas permeability, because various kinds of adhesives are admixed in relatively large amounts with the intention of enhancing the surface gloss after printing and securing the surface strength upon printing.

When a coated paper as described above is used as transfer paper for xerography, it is known that the coated paper causes a so-called blister phenomenon, or a phenomenon such that the coated paper cannot completely let out the vapor generated therein by its moisture being quickly heated through the fixation with heating rollers, thereby causing interlayer separation in the coated layer part or the raw paper part. This blister phenomenon roughens images (*Japanese Journal of Paper Technology,* vol. 27, No. 4 (1984), pp. 31–36).

As preventive measures taken against the blister phenomenon, there are known, for instance, the method of controlling both surface roughness and air permeability to no more than 4,000 seconds (Tokko Hei 5-82939 and Tokko Hei 5-82940, wherein the term "Tokko" means "examined Japanese patent publication"); the method of providing a coated layer having a coverage rate of 2 to 5 $g/m^2$ and a sufficient water vapor transmission rate, which is controlled within the range of 50 to 500 $g/m^2 \times 24$ hours, on each side of a raw paper having a limited air permeability (Tokkai Hei 1-245265, wherein the term "Tokkai" means "unexamined published Japanese patent application"); and the method of providing a coated layer having surface roughness not more than 2.0 μm and a surface electric resistance not less than $8 \times 10^8 \Omega$ at 20° C., 85% RH (Tokkai Sho 62-198877).

Most of those coated papers are, however, low in surface gloss before they undergo a printing operation. Although some of them are originally high in surface gloss, they have a defect such that their gloss balance is not good as a whole because of their low image gloss in the halftone area having a small quantity of toner, while in the solid area having a large quantity of toner they suffer from the blister phenomenon. Accordingly, the coated papers as described above are unsuitable to transfer paper for xerography when high image quality equal to that attainable with high-grade graphic arts paper and photographic printing paper, especially uniform and high image gloss, is required thereof irrespective of the quantity of toner.

On the other hand, a thermal transfer system comes into wide use at the present time. The system uses ink sheets colored yellow, magenta and cyan, or three primary colors, respectively. Each of the ink sheets has on a support an ink coating containing a heat-fusible compound and a coloring material as main components. Each ink sheet is brought into a face-to-face contact with a transfer paper, and heat is applied thereto with a thermal head to transfer the ink onto the transfer paper. Thus, in analogy with color printing, a full color recording is obtained on the transfer paper by the foregoing three primary colors' being variously overlapped. Therefore, the amount of ink transferred on the transfer paper in this system is two or three times as much as that in the system for monochromatic recording. The ink image formed on the transfer paper becomes more nonuniform as the first layer (yellow), the second layer (magenta) and the third layer (cyan) are superposed successively. That is, the ink image formed does not have satisfactory quality. For instance, a green-colored solid area is formed by superposition of cyan ink upon yellow ink. In this case, the solid area thus formed involves parts having colors other than green in viewing it microscopically unless both yellow ink and cyan ink are uniformly transferred. This phenomenon is called the running-over phenomenon of ink, which is a current serious problem.

If plain paper such as copying paper is used as transfer paper in the foregoing thermal transfer system also, the running-over problem of ink can be solved. However, using plain paper as the transfer paper has a counterbalancing disadvantage in marked deterioration of image quality resulting from much roughness of the paper surface. More specifically, transfer unevenness is caused by insufficient contact between the paper surface and the thermal head, and transferred colors are deficient in clearness and density due to too much ink permeation into the paper.

Accordingly, in general printers and copying machines of thermally fused ink transfer type, wood free paper having undergone a surface treatment for heightening the smoothness, such as a supercalendering treatment, has been used as transfer paper. In particular, images recorded on such a surface-treated paper are known to become clear when the paper has smoothness of not less than 100 seconds on the recording side. This is because the paper surface can be brought into closer contact with the ink donor sheet upon recording by virtue of its heightened smoothness on the recording side. Such paper has fairly good image reproducibility in a solid image area, as described above, while in a halftone image area the image reproducibility thereof is still insufficient.

Thus, a countermeasure that suggests itself is to use coated papers having higher smoothness. However, it is the present state of things that coated papers generally used for graphic arts which have high smoothness and high surface gloss are not used as the transfer paper for the thermally fused ink transfer process. This is because a transferred ink image on coated paper can have good quality in theory since the coated paper can be in uniform contact with an ink donor sheet upon recording because of its very high surface smoothness, but in fact the image reproduced on the coated paper does not have satisfactory quality as the ink is not uniformly transferred to the coated paper. This tendency is more pronounced when art paper or another coated paper for graphic arts, which has particularly high smoothness and surface gloss, is used as transfer paper.

As reasons for it, the following can be thought: Since such a coated paper for graphic arts is made highly smooth by the use of a surface-treatment apparatus, usually a supercalender, the surface part of the coated layer is poor in roughness and void. Thus, there are caused troubles such that fused ink cannot firmly hold on to the surface of the transfer paper (that is, it has poor anchorage), and the ink once transferred to the paper is retransferred to the ink donor sheet through the running-over phenomenon of ink.

Such being the case, various measures have been proposed. Examples thereof include the method of coating an aqueous coating material comprising a water-soluble adhesive and a pigment on a paper sheet to prepare a thermal ink-transfer recording material (Tokko Sho 59-16950), the method of using an oil absorbing pigment having oil absorption of not less than 30 ml/100 g (Tokkai Sho 57-182487), the method of adding fine particles of a vinyl polymer having a particle size of from 0.1 to 1.0 μm and Tg of not lower than 80° C. (Tokkai Sho 60-38192), and the method of using a nonionic water-soluble polymer having a low polymerization degree and a porous pigment having oil absorption of from 30 to 200 ml/100 g (JIS-K5101)as main components (Tokko Hei 5-19919 and Tokko Hei 5-78439).

However, all the products obtained adopting the above-cited methods are originally low in surface gloss, and have a so-called matte surface. Therefore, the gloss of the images printed thereon (i.e., image gloss) is increased with an increase in quantity of ink, although the density thereof is rather high. As a whole, the images printed thereon cannot have such high and uniform gloss as those formed in photographic printing paper have. That is, those products are inferior in image gloss balance, so they fail in providing images of high quality. It can be thought that this failure is attributable to the use of a surface-treatment apparatus, such as a supercalender, with the intention of improving the surface properties. More specifically, it can be considered that the use of a surface-treatment apparatus causes reduction of voids and roughness at the paper surface, and thereby the paper surface cannot have an oil absorbing power high enough to receive images.

As described above, it is the present condition that there are not yet known thermal transfer papers of the type which can provide, in full-color printing, images of high quality with respect to image characteristics including reproducibility, sharpness, gradation and so on, and image gloss as a whole, even in the halftone image area having a small quantity of ink.

As a result of our intensive studies for solving the above-described problems, it has been found out that when the printing utilizing xerography or a thermally fused ink transfer process is carried out the void structure of transfer paper, especially the void structure at the transfer layer surface, plays an important role in providing the printed images with high and uniform gloss as a whole irrespective of the quantity of toner or ink, thereby achieving the present invention.

SUMMARY OF THE INVENTION

Therefore, an object of the present invention is to provide a transfer paper which, when used in a printer or copying machine utilizing xerography or a thermally fused ink transfer process, is free from running-over phenomenon of fused toner or ink and can form thereon images having not only excellent characteristics, including image reproducibility, sharpness and gradation, but also high and uniform image gloss as a whole irrespective of the quantity of toner or ink.

The above-described object is attained with a transfer paper comprising a support coated on at least one side with a transfer layer having a thickness of not less than 3 μm and at least one constituent layer; the outermost layer of said transfer layer being a coated layer containing at least a pigment and a binder, and having in the part extending to the depth of at least 3 μm below the surface the hole distribution characterized by having at least one peak which shows the average pore diameter within the range of 0.1 to 1.0 μm and the height ranging from 0.1 to 1.0 ml/g with respect to the pore volume when measured with a porosimeter of mercury injection type.

DETAILED DESCRIPTION OF THE INVENTION

In order to determine the void structure of a transfer layer surface, a transfer paper from which the surface part has been pared away in a layer at least 3 μm thick with a razor or the like are each examined for hole distribution by means of a porosimeter of mercury injection type. Differences between the thus obtained hole distribution curves are investigated, thereby specifying the void structure of the surface layer pared off.

A reason why it is required of the surface layer to specify its void structure is set forth below: In preparing coated papers, various coating and finishing methods can be adopted. Even if the same coating composition is used, the coated papers as final products are different in void structure from one another if different coating methods, drying conditions or/and so on are adopted in preparation thereof. Therefore, it is necessary to use the obtained product itself in determining the void structure. Even when the transfer layer has a single-layer structure, the upper and the lower parts thereof are sometimes different in void structure for the same reason as described above. In this case also, it is therefore necessary to specify the void structure of the surface part.

A reason why the thickness of the surface layer to be examined for hole distribution is defined as at least 3 μm is the following: In xerography or a thermally fused ink transfer process, the fused toner or ink is absorbed into transfer paper, and extends its influence to the depth of 3 μm or so below the surface. Therefore, it is unnecessary to examine the part exceeding the above-defined thickness.

The hole distribution measurements reveal that in order to obtain a transfer paper which enables the reproduction of a high quality image, that is, ensures uniform image gloss as a whole irrespective of the quantity of toner or ink and high image density, it is important for the hole distribution in the surface layer to have at least one peak which shows the average pore diameter within the range of 0.1 to 1.0 μm and the height ranging from 0.1 to 1.0 ml/g with respect to the pore volume.

When the average pore diameter is smaller than 0.1 μm, the absorption speed of the fused toner or ink becomes slow even when the pore volume is large. As a result of it, satisfactory transfer of toner or ink cannot be effected. On the other hand, the average pore diameter larger than 1.0 μm is undesirable because it lowers the surface gloss of the resulting paper.

When the pore volume is smaller than 0.1 ml/g, the transfer paper has a too compact surface. In xerography, therefore, the surface of the transfer paper becomes uneven by the transferred toner to lower the image gloss, particularly in the halftone image area; while, in the thermally fused ink transfer process, the fused ink is retransferred to the ink donor sheet through the running-over phenomenon, thereby deteriorating the image reproduction. On the other hand, the pore volume greater than 1.0 ml/g permits the permeation of fused toner or ink into the inner part of the transfer paper to result in lowering of image density and sharpness.

In providing a transfer layer having the void structure defined by the present invention, it is desirable that a pigment used in the coating composition for constituting the surface part of the transfer layer be chosen from those capable of forming as many voids as possible after coating.

Besides the above-described point, there is no other particular restriction as to the pigment to be used. However, pigments having great oil absorption (JIS K 5101), those having small bulk density (JIS K 5101) and those having a great aspect ratio are individually used to advantage. If attention is directed to only oil absorption in choosing a suitable pigment, pigments having oil absorption ranging from 20 ml/100 g to 400 ml/100 g, particularly from 25 ml/100 g to 300 ml/100 g, are preferred.

It is possible to choose a proper pigment from conventional ones. In particular, it is desirable to choose the pigment used in the present invention from inorganic pigments including kaolin, clay, ground calcium carbonate, precipitated calcium carbonate, aluminum hydroxide, satin white, calcined clay and synthetic silica, and organic pigments made from polystyrene and styrene-acrylic copolymer respectively whose primary particles are fine particles. These pigments may be used alone or as a mixture of two or more thereof. Accordingly, it is possible to use a pigment having small oil absorption in combination with a pigment having great oil absorption, provided that the resulting combination has its average oil absorption within the above-described range. In particular, pigments having a spindle form or a needle form, and secondary aggregates of fine-grain pigments are advantageous in that they can increase the voids in the coated layer by virtue of their great inner voids.

When a binder used as adhesive is added in excess, the binder is charged into voids even if a pigment capable of increasing voids in quantity is used together therewith. In such a case, the resulting transfer layer has reduced voids, so that it cannot provide a desirable image quality.

Therefore, it is required to control the amount of a binder used according to the species thereof.

Further, some sorts of binders cause migration depending on the coating method adopted and the type of a raw paper used. That is, the amount of binders remaining in the surface part of a transfer layer vary depending on the species thereof even when they are used in the same amount. Therefore, it is also required to control the amount of a binder used according to what coating method is adopted and what type of a raw paper is used.

Taking into account these points, it is desirable that the amount of a binder admixed be within the range of 2/a to 30/a (parts by weight). Herein, "a" represents the bulk density (g/ml) of a pigment used together with the binder.

When the amount of a binder admixed is less than 2/a, the coating as a transfer paper is short of strength, and liable to come off; whereas when it is more than 30/a, the transfer layer surface becomes too compact, and the voids necessary to absorb fused toner or ink are reduced in quantity to deteriorate the image quality.

The binder has no particular restriction, provided that it can ensure sufficient adhesion power between a pigment and a raw paper and does not give rise to a blocking phenomenon between transfer papers. Binders which can be suitably used in the present invention are natural high-molecular compounds. Specific examples thereof include various kinds of starch, such as oxidized starch, esterified starch, enzyme-denatured starch, cationized starch, etc.; proteins, such as casein, soybean protein, etc.; and cellulose derivatives such as carboxymethyl cellulose, hydroxyethyl cellulose, etc. Also, water-soluble high polymers such as polyvinyl alcohol, latexes of styrene-acryl copolymer type and styrene-butadiene type, various resins and emulsions of vinyl acetate type and acrylic type, and so on can be used to advantage. These binders may be used alone or as a mixture of two or more thereof. From the standpoint of satisfying beth of the requirements for surface gloss and voids in the surface layer, it is desirable to adopt a cast coating method, especially that of a wet process, in forming a transfer layer. In case of adopting a cast coating method, it is preferable to use as binder the combination of a protein or a polyurethane resin with a latex.

It is desirable for the binder to comprise from 10 to 90% by weight of a protein or a polyurethane resin and from 10 to 90% by weight of a latex.

In addition to the above-described ingredients, the transfer layer of the present invention may optionally contain various additives, including dyes for controlling hue, a dispersing agent for pigments, an antiseptic, a defoaming agent, a surface lubricant, a pH modifier and so on.

The coverage rate on one side of a support ranges from 2 to 30 $g/m^2$, preferably from 10 to 25 $g/m^2$, on a bone dry weight basis. The present invention does not have any particular restriction as to the method of coating a transfer layer. Any coating methods, including a blade coating method and an air knife coating method, can be used. From the viewpoint of ensuring high surface gloss and controlling the voids in the surface layer to the range defined by the present invention, as described above, it is advantageous to adopt a cast coating method, and to dry the coating as a transfer layer in a manner such that the coating surface is directly pressed to a drum surface as it is in a wet condition. In particular, it is preferable in the present invention to adopt the cast coating method involving a solidifying process or a direct cast coating method, because these methods can provide excellent surface properties.

A raw paper on which the transfer layer is coated can be properly chosen from conventional ones. For instance, various types of raw paper, including acidic paper, neutralized paper and paper stock-mixed paper, can be used. However, thick paper having a basis weight of not less than 50 $g/m^2$ and a high degree of whiteness is desirable from the standpoint of ensuring sufficient stiffness, high workability upon coating and a high-grade feeling.

In accordance with the present invention, images recorded on the transfer paper using xerography or a thermally fused ink transfer process are free from running-over phenomenon of fused toner or ink and excellent in image reproducibility and image characteristics such as tone, and have uniform and high image gloss as a whole irrespective of the quantity of toner or ink. The following can be supposed to be reasons why the present invention has these advantages:

In xerography or a thermally fused ink transfer process, the solid areas have fairly high image gloss even when a plain paper type transfer paper having low surface gloss is used because toner or ink is almost uniformly transferred thereto and the toner or ink itself has high gloss. In the halftone areas and the highlight areas which are low in quantity of toner or ink, on the other hand, parts having high gloss ascribed to toner or ink are mingled with parts having low gloss ascribed to the transfer paper itself. Accordingly, the image gloss in such areas varies depending on the quantity of toner or ink, and becomes considerably low, compared with that in the solid areas. Such being the case, it has been attempt to use coated papers having enhanced surface gloss. However, these coated papers suffer from the running-over phenomenon of fused toner or ink because of the shortage of voids at their surfaces. As a result of it, images recorded thereon are inferior in image reproducibility and image quality including tone. In addition, projections of toner or ink are formed on the paper surface to increase irregular reflection, thereby lowering the image gloss.

In contrast, the present transfer paper has voids of the specified size at the surface as it retains high surface gloss. This makes it possible to ensure high and uniform image gloss to the whole image areas, extending from the background area to highlight, halftone and solid image areas, irrespective of the quantity of toner or ink. Thus, the present transfer paper can provide prints of high quality.

ADVANTAGES OF THE INVENTION

When used in xerography and a thermally fused ink transfer process, the present transfer paper can provide prints having a high-grade feeling, that is, uniform and high image gloss irrespective of the quantity of toner or ink, satisfactory image reproducibility and excellent gradation, because the transfer layer surface thereof has a special void structure in which holes of a specified size are present in a specified quantity as it secures as high and uniform surface gloss as photographic printing paper.

EXAMPLE

Now, the present invention will be illustrated in greater detail by reference to the following examples. However, the invention should not be construed as being limited to these examples. Additionally, all "parts" expressing the amounts of ingredients used in the examples are by weight. The measurements for evaluation of image quality obtained in the examples are performed in the following manners.

Paper Surface Gloss Before Recording

The measurement is carried out according to the method defined by JIS P 8142.

Image Gloss

Images of violet color having their respective dot percents within the range of 20 to 100% are recorded on a transfer paper with a plain paper copying machine Model Artage 5330, products of Ricoh Co., Ltd., in case of xerography, while with a color hard copy printer Model CHC33, products of Shinkoh Denki Co., Ltd., in case of the thermally fused ink transfer process, and the image gloss in the highlight areas (dot percent: 30%), that in halftone areas (dot percent: 50%) and that in solid areas (dot percent: 100%) are measured according to the method defined by JIS P 8142.

Blister

A solid image of violet color (measuring 5 cm×5 cm in size) is copied with a plain paper copying machine Artage 5330, products of Ricoh Co., Ltd., on a transfer paper having undergone the pretreatment according to the method defined by JIS P 8111 under the temperature of 20°±2° C. and the relative humidity of 65±5%. Then, the extent of blister generated on the copied face is evaluated by visual observation according to the following criterion.

o: No blister spot is observed at all.

Δ: One to three blister spots are observed.

X: Not less than 4 blister spots are observed.

Running-over of Ink

Three kinds of single color, cyan, magenta and yellow, and three kinds of mixed color, green, violet and black, are respectively printed on a transfer paper with a color hard copy printer Model CHC33, products of Shinkoh Denki Co., Ltd., and the images obtained are evaluated by visual observation according to the following criterion.

o: No running-over of ink is observed at all even in the mixed color areas.

Δ: Running-over of ink is observed in the mixed color areas.

X: Running-over of ink is observed in the single color areas.

Image Reproduction

The image samples used for the measurement of image gloss are examined for difference in color from the original and for uneven color by visual observation. The extent of the difference and unevenness in color is evaluated according to the following criterion:

o: The difference in color and uneven color are hardly observed.

Δ: The difference in color and uneven color are slightly observed.

X: The difference in color and uneven color are considerably observed.

Uniformity of Gloss

The image samples used for the measurement of image gloss are examined for gloss balance, and evaluated using the following criterion:

o: Gloss is uniform and high as a whole.

Δ: Gloss is on a low level as a whole.

X: Image gloss is partly lower than that of the background area.

Hole Distribution Curve

A transfer paper itself and transfer paper from which the surface part has been pared away in a layer at least 3 μm thick are each examined for hole distribution curve by a mercury injection method. A comparison of the thus obtained hole distribution curves are made, and thereby is specified the void structure of the surface layer about 3 μm thick.

EXAMPLE 1

A raw paper used as support was made from 100 parts of hardwood Kraft pulp having freeness of 420 ml admixed with 20 parts of ground calcium carbonate, 0.2 part of alkyl ketene dimer and 0.5 part of aluminum sulfate, and subjected to a calendering treatment. The raw paper thus made had smoothness of 40 seconds and basis weight of 88 g/m$^2$.

On one side of the raw paper was coated by a cast coating method a 16 g/m$^2$ of a coating composition prepared using as a pigment the blend of 50 parts of precipitated calcium carbonate (Brilliant 15, products of Shiraishi Kogyo K.K.) with 50 parts of ground calcium carbonate (ES#200, products of Sankyo Seifun K.K.) and mixing the pigment with a binder constituted of 18 parts of casein and 22 parts of a styrene-butadiene latex (JSR 0617: products of Nippon Synthetic Rubber Co., Ltd.), 0.5 part of calcium stearate, 0.3 part of sodium polyacrylate (Alon T-45, products of Toa Gosei Kagaku Co., Ltd.), a pH adjusting agent and a lubricant. Thus, a transfer paper having basis weight of 104 g/m$^2$ was obtained.

EXAMPLE 2

A coating composition prepared in the same manner as in Example 1, except that the pigment used was changed to 100 parts of precipitated calcium carbonate (Brilliant 15, products of Shiraishi Kogyo K.K.) and the amounts of casein and the latex admixed were changed to 20 parts and 30 parts respectively, was coated on one side of the same raw paper as made in Example 1 at a coverage rate of 17 g/m$^2$ in accordance with a cast coating method. Thus, a transfer paper having basis weight of 105 g/m$^2$ was obtained.

EXAMPLE 3

A coating composition prepared in the same manner as in Example 1, except that the pigment used was changed to 100 parts of first-class kaolin (Ultrawhite 90, products of EMC Co., Ltd.) and the amounts of casein and the latex admixed were changed to 5 parts and 10 parts respectively, was coated on one side of the same raw paper as made in Example 1 at a coverage rate of 18 g/m$^2$ in accordance with a cast coating method. Thus, a transfer-paper having basis weight of 106 g/m$^2$ was obtained.

EXAMPLE 4

A coating composition prepared in the same manner as in Example 1, except that the pigment used was changed to the blend of 60 parts of ground calcium carbonate (Super #1700, products of Maruo Calcium K.K.) with 40 parts of synthetic silica (Mizukasil P-78A, products of Mizusawa Kagaku Kogyo Co., Ltd.) and the amounts of casein and the latex admixed were changed to 30 parts and 30 parts respectively, was coated on one side of the same raw paper as made in Example 1 at a coverage rate of 15 g/m$^2$ in accordance with a cast coating method. Thus, a transfer paper having basis weight of 103 g/m$^2$ was obtained.

EXAMPLE 5

A coating composition prepared in the same manner as in Example 1, except that the pigment used was changed to 100 parts of synthetic silica (Mizukasil P-78A, products of Mizusawa Kagaku Kogyo Co., Ltd.) and the amounts of casein and the latex admixed were changed to 35 parts and 45 parts respectively, was coated on one side of the same raw paper as made in Example 1 at a coverage rate of 15 g/m$^2$ in accordance with a cast coating method. Thus, a transfer paper having basis weight of 103 g/m$^2$ was obtained.

EXAMPLE 6

A coating composition prepared in the same manner as in Example 1, except that the amounts of casein and the latex admixed were changed to 3 parts and 7 parts respectively, was coated on one side of the same raw paper as made in Example 1 at a coverage rate of 15 g/m$^2$ in accordance with a blade coating method, dried with an air dryer, and then subjected to a supercalendering treatment. Thus, a transfer paper having smoothness of 800–1,000 seconds and basis weight of 103 g/m$^2$ was obtained.

COMPARATIVE EXAMPLE 1

A coating composition prepared in the same manner as in Example 1, except that the pigment used was changed to 100 parts of first-class kaolin (Ultrawhite 90, products of EMC Co., Ltd.) and the amounts of casein and the latex admixed were changed to 15 parts and 20 parts respectively, was coated on one side of the same raw paper as made in Example 1 at a coverage rate of 15 g/m$^2$ in accordance with a cast coating method. Thus, a transfer paper having basis weight of 103 g/m$^2$ was obtained.

COMPARATIVE EXAMPLE 2

A coating composition prepared in the same manner as in Example 1, except that the pigment used was changed to 100 parts of ground calcium carbonate (Super #1700, products of Maruo Calcium K.K.) and the amounts of casein and the latex admixed were changed to 20 parts and 30 parts respectively, was coated on one side of the same raw paper as made in Example 1 at a coverage rate of 13 g/m$^2$ in accordance with a cast coating method. Thus, a transfer paper having basis weight of 101 g/m$^2$ was obtained.

COMPARATIVE EXAMPLE 3

The same coating composition as prepared in Example 4 was coated on one side of the same raw paper as made in Example 1 at a coverage rate of 14 g/m$^2$ in accordance with a blade coating method, and then subjected to a supercalendering treatment. Thus, a transfer paper having smoothness of 800–1,000 seconds and basis weight of 102 g/m$^2$ was obtained.

COMPARATIVE EXAMPLE 4

A coating composition prepared in the same manner as in Example 1, except that the pigment used was changed to 100 parts of ground calcium carbonate (Super S, products of Maruo Calcium K.K.) and the amounts of casein and the latex admixed were each changed to 5 parts, was coated on one side of the same raw paper as made in Example 1 at a coverage rate of 15 g/m$^2$ in accordance with a cast coating method. Thus, a transfer paper having basis weight of 103 g/m$^2$ was obtained.

The transfer layers of the transfer papers prepared in Examples 1 to 6 and Comparative Examples 1 to 4 were each examined for hole distribution, and the results thereof are shown in Table 1. Further, the images were printed on the foregoing transfer layers respectively using each of a plain paper copying machine utilizing xerography and a color hard copy printer utilizing a thermally fused ink transfer process, and undergone the aforementioned quality evaluation. The results thereof are shown in Table 2 and Table 3.

TABLE 1

| | Characteritics of Pigment | | Amount of | | Hole Distribution Curve | | | |
|---|---|---|---|---|---|---|---|---|
| | | | | | Average Pore | | Pore | |
| | Oil Absorption | Bulk Density | Binder mixed | Coating | Diameter (μm) | | Volume (ml/g) | |
| | (ml/100 g) | (g/ml) | (pts. wt.) | Method | a | b | A | B |
| Example 1 | 40 | 0.5 | 40 | cast | 0.4 | 0.05 | 0.3 | 0.2 |
| Example 2 | 60 | 0.4 | 50 | cast | 0.5 | 0.03 | 0.4 | 0.2 |
| Example 3 | 30 | 0.9 | 15 | cast | 0.3 | 0.02 | 0.2 | 0.15 |
| Example 4 | 120 | 0.3 | 60 | cast | 0.3 | 0.04 | 0.2 | 0.2 |
| Example 5 | 240 | 0.2 | 80 | cast | 0.8 | 0.2 | 0.6 | 0.3 |
| Example 6 | 40 | 0.5 | 10 | coat | 0.3 | — | 0.2 | — |
| Comparative Example 1 | 30 | 0.9 | 35 | cast | 0.08 | — | 0.15 | — |
| Comparative Example 2 | 40 | 0.8 | 50 | cast | 0.4 | — | 0.08 | — |
| Comparative Example 3 | 120 | 0.3 | 60 | coat | 0.3 | 0.02 | 0.08 | 0.1 |
| Comparative Example 4 | 20 | 1.1 | 10 | cast | 1.2 | — | 0.6 | — |

TABLE 2

Quality Evaluation of Images Recorded Using Xerography

| | Paper Surface Gloss (%) before Recording | Gloss (%) in Background Area | Gloss (%) in Image areas Dot Percent (%) | | | Uniformity of Gloss as a whole | Blister | Image Reproduction |
|---|---|---|---|---|---|---|---|---|
| | | | 30 | 50 | 100 | | | |
| Example 1 | 90 | 88 | 88 | 90 | 92 | o | o | o |
| Example 2 | 88 | 86 | 86 | 90 | 92 | o | o | o |
| Example 3 | 86 | 84 | 84 | 88 | 90 | o | o | o |
| Example 4 | 87 | 85 | 86 | 88 | 92 | o | o | o |
| Example 5 | 83 | 80 | 82 | 86 | 90 | o | o | o |
| Example 6 | 63 | 62 | 72 | 76 | 82 | o | o | o |
| Comparative Example 1 | 76 | 74 | 54 | 40 | 76 | x | o | x |
| Comparative Example 2 | 78 | 76 | 58 | 50 | 78 | x | Δ | Δ |
| Comparative Example 3 | 42 | 40 | 44 | 56 | 68 | Δ | x | o |
| Comparative Example 4 | 52 | 50 | 54 | 58 | 76 | Δ | Δo | |

TABLE 3

Quality Evaluation of Images Recorded According to Thermally Fused Ink Transfer Process

| | Paper Surface Gloss (%) before Recording | Gloss (%) in Background Area | Gloss (%) in Image areas Dot Percent (%) | | | Uniformity of Gloss as a whole | Running-over of Ink | Image Reproduction |
|---|---|---|---|---|---|---|---|---|
| | | | 30 | 50 | 100 | | | |
| Example 1 | 90 | 88 | 92 | 94 | 98 | o | o | o |
| Example 2 | 88 | 86 | 90 | 94 | 96 | o | o | o |
| Example 3 | 86 | 84 | 88 | 92 | 94 | o | o | o |
| Example 4 | 87 | 85 | 90 | 91 | 95 | o | o | o |
| Example 5 | 83 | 80 | 86 | 90 | 92 | o | o | o |
| Example 6 | 63 | 62 | 78 | 84 | 88 | o | o | o |
| Comparative Example 1 | 76 | 74 | 60 | 48 | 86 | x | o | Δ |
| Comparative | 78 | 76 | 62 | 56 | 84 | x | o | Δ |

TABLE 3-continued

| Quality Evaluation of Images Recorded According to Thermally Fused Ink Transfer Process | Paper Surface Gloss (%) before Recording | Gloss (%) in Background Area | Gloss (%) in Image areas Dot Percent (%) 30 | 50 | 100 | Uniformity of Gloss as a whole | Running -over of Ink | Image Reproduction |
|---|---|---|---|---|---|---|---|---|
| Example 2 comparative Example 3 | 42 | 40 | 48 | 62 | 74 | Δ | x | Δ |
| Comparative Example 4 | 52 | 50 | 58 | 64 | 80 | Δ | x | Δ |

What is claimed is:

1. A transfer paper comprising:

a support paper coated on at least one side with a transfer layer having a thickness of not less than 3 μm and having one or more constituent layers;

the outermost constituent layer of said transfer layering being a coated layer containing at least a pigment and a binder, said coated layer having in the part extending to the depth of at least 3 μm below the surface a hole distribution curve having at least one peak showing average pore diameter within the range of 0.1 to 1.0 μm and a height ranging from 0.1 to 1.0 ml/g with respect to pore volume when measured with a porosimeter of mercury injection type, wherein the average oil absorption of said pigment is within the range of 20 ml/100 g to 400 mg/100 g and the content of binder in the coating composition for forming the coated layer is within the range of 2/a to 30/a parts by weight wherein a is the bulk density of said pigment.

2. A transfer paper of claim 1, wherein the average oil absorption of said pigment is within the range of 25 ml/100 g to 300 ml/100 g.

3. A transfer paper of claim 1, wherein said binder comprises from 10 to 90% by weight of a protein or a polyurethane resin and from 10 to 90% by weight of a latex.

4. A transfer paper of claim 2, wherein said binder comprises from 10 to 90% by weight of a protein or a polyurethane resin and from 10 to 90% by weight of a latex.

5. A transfer paper of claim 1, wherein said transfer layer has surface gloss of from 60 to 100%.

6. A transfer paper of claim 2, wherein said transfer layer has surface gloss of from 60 to 100%.

7. A transfer paper of claim 3, wherein said transfer layer has surface gloss of from 60 to 100%.

8. A transfer paper according to claim 1, wherein the coverage rate of said coated layer is 2–30 $g/m^2$ on a bone dry weight basis.

9. A transfer paper according to claim 1, wherein the coverage rate of said coated layer is 10–25 $g/m^2$ on a bone dry weight basis.

10. A transfer paper according to claim 1, wherein said support paper has a basis weight of not less than 50 $g/m^2$.

11. A transfer paper according to claim 1, wherein said pigment is kaolin, clay, ground calcium carbonate, precipitated calcium carbonate, aluminum hydroxide, satin white, calcined clay, synthetic silica, a polystyrene and styrene-acrylic copolymer, or combinations thereof.

12. A transfer paper according to claim 1, wherein said binder is oxidized starch, esterified starch, enzyme-denatured starch, cationized starch, casein, soybean protein, carboxymethyl cellulose, hydroxyethyl cellulose, polyvinyl alcohol, a latex of styrene-acryl copolymer, a latex of styrene-butadiene, a vinyl acetate emulsion, an acrylic emulsion, or mixtures thereof.

13. A transfer paper according to claim 1, wherein the weight ratio of binder to pigment in said coated layer is 10:100–80:100.

14. A transfer paper according to claim 3, wherein said protein is casein.

15. A transfer paper according to claim 4, wherein said protein is casein.

16. A transfer paper according to claim 1, wherein the weight ratio of binder to pigment in said coated layer is 15:100–80:100.

17. A transfer paper according to claim 1, wherein the weight ratio of binder to pigment in said coated layer is 15:100–50:100.

* * * * *